(12) United States Patent
St. Clair

(10) Patent No.: US 9,298,295 B2
(45) Date of Patent: Mar. 29, 2016

(54) GESTURES FOR AUTO-CORRECT

(75) Inventor: Luke St. Clair, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 83 days.

(21) Appl. No.: 13/557,654

(22) Filed: Jul. 25, 2012

(65) Prior Publication Data

US 2014/0028571 A1   Jan. 30, 2014

(51) Int. Cl.
- *G06F 3/041* (2006.01)
- *G06F 3/0488* (2013.01)
- *G06F 3/023* (2006.01)

(52) U.S. Cl.
CPC ............ *G06F 3/0412* (2013.01); *G06F 3/0237* (2013.01); *G06F 3/04883* (2013.01); *G06F 3/04886* (2013.01)

(58) Field of Classification Search
CPC . G06F 3/0487; G06F 3/0488; G06F 3/04883; G06F 3/0237; G06F 3/048; G06F 3/04895; G06F 3/0482; G06F 17/276; G06F 3/0412; G06F 3/04886; G06F 3/04842
USPC .......... 345/168, 173, 156; 715/763, 863, 773; 715/257; 702/57; 704/275; 382/177; 341/22; 455/566; 707/767; 709/217
See application file for complete search history.

(56) References Cited

U.S. PATENT DOCUMENTS

| | | | | |
|---|---|---|---|---|
| 8,473,507 B2* | 6/2013 | Loofbourrow et al. | ....... | 707/767 |
| 8,479,122 B2* | 7/2013 | Hotelling et al. | ............. | 715/863 |
| 8,566,045 B2* | 10/2013 | Shaffer et al. | .................... | 702/57 |
| 8,661,350 B2* | 2/2014 | Kim et al. | ...................... | 715/744 |
| 2002/0143828 A1* | 10/2002 | Montero et al. | .............. | 707/533 |
| 2005/0169527 A1* | 8/2005 | Longe et al. | .................... | 382/177 |
| 2007/0182595 A1* | 8/2007 | Ghasabian | ....................... | 341/22 |
| 2008/0122796 A1* | 5/2008 | Jobs et al. | ...................... | 345/173 |
| 2009/0007001 A1* | 1/2009 | Morin et al. | ................... | 715/773 |
| 2009/0077464 A1* | 3/2009 | Goldsmith et al. | ........... | 715/257 |
| 2009/0247230 A1* | 10/2009 | Lundy et al. | ................... | 455/566 |
| 2010/0131900 A1* | 5/2010 | Spetalnick | ..................... | 715/825 |
| 2010/0325136 A1* | 12/2010 | Chaudhuri et al. | ........... | 707/759 |
| 2011/0035402 A1* | 2/2011 | Agrawal et al. | ............... | 707/769 |
| 2011/0169743 A1* | 7/2011 | Oh et al. | ........................ | 345/169 |
| 2011/0197153 A1* | 8/2011 | King et al. | ..................... | 715/769 |
| 2012/0127071 A1* | 5/2012 | Jitkoff et al. | ................... | 345/156 |
| 2012/0216141 A1* | 8/2012 | Li | ................. | 715/780 |
| 2013/0007606 A1* | 1/2013 | Dolenc | ......................... | 715/256 |
| 2013/0046544 A1* | 2/2013 | Kay et al. | ...................... | 704/275 |
| 2013/0100036 A1* | 4/2013 | Papakipos et al. | ............ | 345/173 |
| 2013/0124980 A1* | 5/2013 | Hudson et al. | ................ | 715/243 |
| 2013/0212515 A1* | 8/2013 | Eleftheriou | ..................... | 715/773 |
| 2013/0311561 A1* | 11/2013 | Ku et al. | ........................ | 709/204 |
| 2013/0311565 A1* | 11/2013 | Barry | ............................. | 709/204 |
| 2013/0332560 A1* | 12/2013 | Knight et al. | ................. | 709/217 |
| 2014/0109044 A1* | 4/2014 | Cifra | .............................. | 717/113 |
| 2015/0019227 A1* | 1/2015 | Anandarajah | .................. | 704/257 |
| 2015/0067596 A1* | 3/2015 | Brown et al. | .................. | 715/808 |
| 2015/0067602 A1* | 3/2015 | Bernstein et al. | ............. | 715/823 |

* cited by examiner

*Primary Examiner* — Larry Sternbane
*Assistant Examiner* — Darlene M Ritchie
(74) *Attorney, Agent, or Firm* — Baker Botts L.L.P.

(57) ABSTRACT

In one embodiment, a method includes, in response to a user entering a string of one or more characters on a computing device, displaying the string on a display of the computing device and determining an auto-suggestion for the string; displaying all or a portion of the auto-suggestion on the display with the string; and, in response to a swipe touch gesture on the display, terminating the display of the auto-suggestion.

15 Claims, 13 Drawing Sheets

US 9,298,295 B2

GESTURES FOR AUTO-CORRECT

TECHNICAL FIELD

This disclosure generally relates to touch input.

BACKGROUND

A touchpad is an input device including a surface that detects touch-based inputs. A touch screen is an electronic visual display that detects the presence and location of user touch inputs. Mobile devices (such as a mobile phone, a tablet computer, and a laptop computer) often incorporate a touch screen or a touchpad to facilitate user interactions with application programs running on the mobile device.

DESCRIPTION OF EXAMPLE EMBODIMENTS

A touchpad is an input device including a surface that detects touch-based inputs of users. Similarly, a touch screen is an electronic visual display surface that detects the presence and location of user touch inputs. So-called dual touch or multi-touch displays or touchpads refer to devices that can identify the presence, location and movement of more than one touch input, such as two- or three-finger touches. A system incorporating one or more touch-based input devices may monitor one or more touch-sensitive surfaces for touch or near touch inputs from a user. When one or more such user inputs occur, the system may determine the distinct area(s) of contact and identify the nature of the touch or near touch input(s) via geometric features and geometric arrangements (e.g., location, movement), and determine if they correspond to various touch events or gestures (e.g., tap, drag, swipe, pinch).

Figure 1:
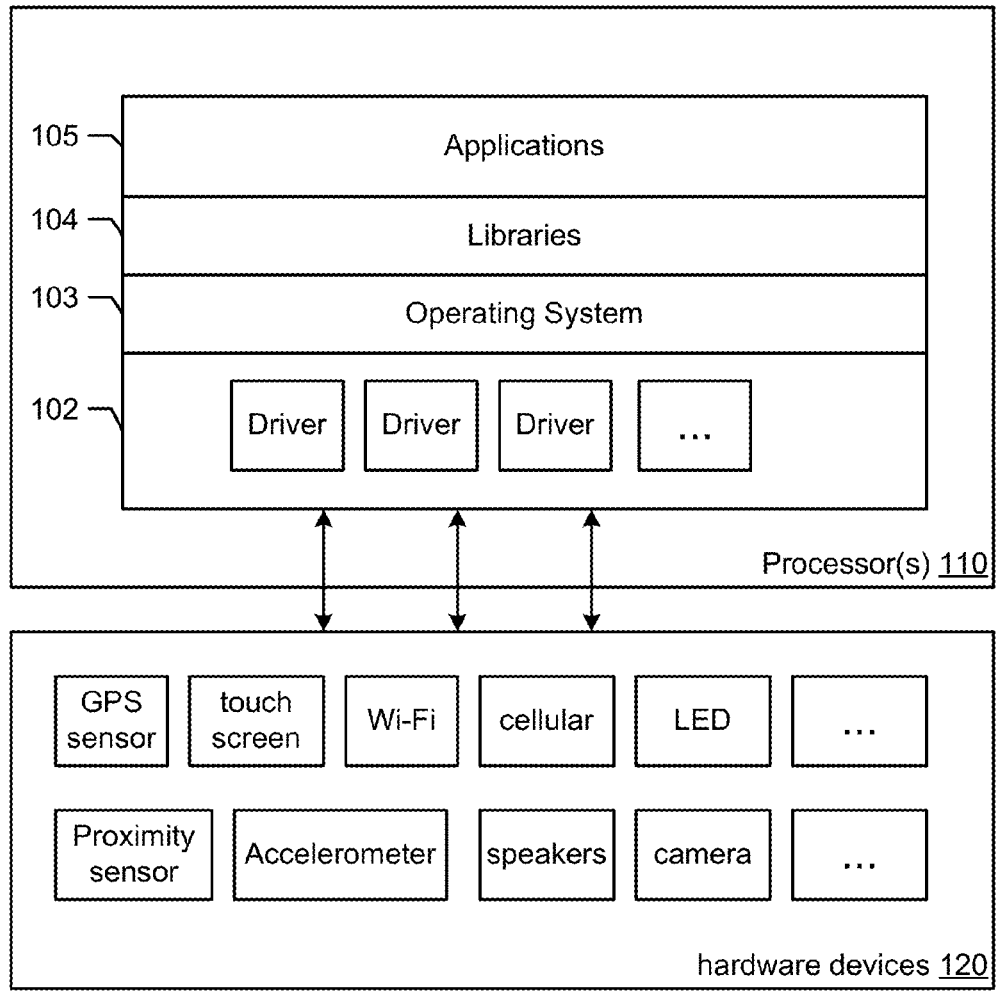
FIG. 1 illustrates an example processing stack of a mobile device.

Recognition of touch events by a system with one or more touch-based input devices—i.e., identifying one or more touch inputs by a user and determining corresponding touch event(s)—may be implemented by a combination of hardware, software, or firmware (or device drivers). FIG. 1 illustrates an example processing stack of a mobile device (e.g., a smart phone, a tablet computer). In the example of FIG. 1, the mobile device may comprise hardware devices (120) such as Input-Output (I/O) devices (e.g., a touch screen, speakers, a light-emitting diode or LED indicator, a camera, etc.), communication interface devices (e.g., a cellular interface, a Wi-Fi interface), sensors (e.g., a Global Positioning System or GPS sensor, a proximity sensor, an accelerometer, etc.), and other hardware devices. One or more device drivers in driver layer 102 hosted by one or more processors 110 of the mobile device can communicate and control the hardware devices. One or more processors 110 can execute various software programs, for example, operating system 103 running one or more application programs (e.g., web browser, address book, etc.) in applications 105 and managing one or more hardware devices via the one or more device drivers in driver layer 102. Libraries 104 can include one or more libraries used by one or more application programs in applications 105. For example, the mobile device may comprise one or more device drivers communicating with one or more touch-based input devices and detecting touch inputs. The system may comprise a touch gesture library containing touch event modules or computer program code for interpreting touch inputs detected by the device drivers to touch events or gestures. A program running on the mobile device can detect and process touch events by subscribing as listeners to touch event modules in the touch gesture library.

Figure 2:
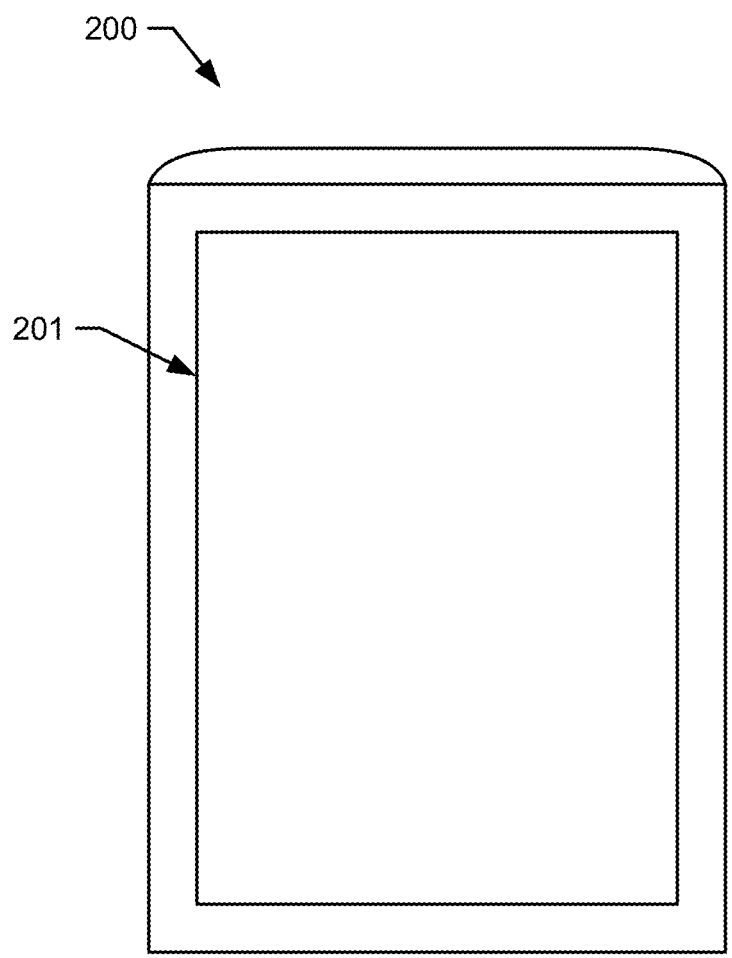
FIG. 2 illustrates an example mobile device.

FIG. 2 illustrates an example mobile device. In the example of FIG. 2, mobile device 200 may comprise a housing with a touch display 201 disposed on a front side of the housing. Touch display 201 may be a single-touch, dual-touch, or multi-touch display. Mobile device 200 may comprise a touch gesture library containing touch event modules or logic that can recognize touch inputs, and determine one or more corresponding touch events or gestures (e.g., tap, draft, swipe, pinch). One or more applications hosted by mobile device 200 may be configured to detect and respond to one or more touch events or gestures by subscribing as listeners to touch event modules in the touch gesture library.

Figure 3A:
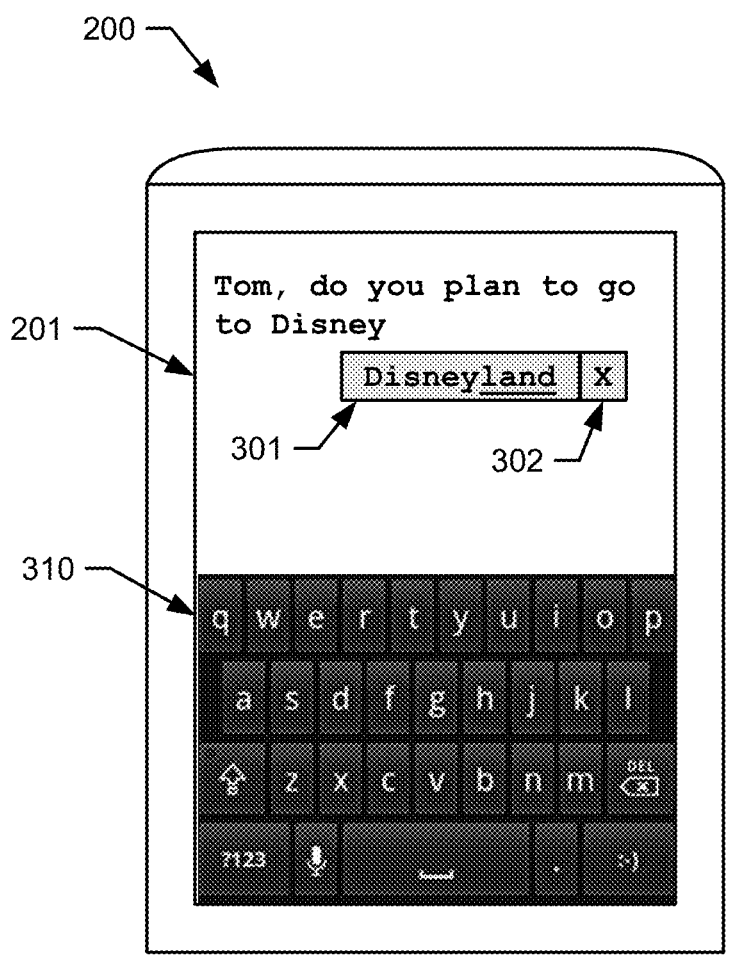
FIGS. 3A-3F illustrate a user interface of an messaging application hosted by a mobile device.

FIG. 3A illustrates a user interface of a messaging application hosted by mobile device 200. A user can enter a message (e.g., a Short Message Service or SMS message, an email message) with a software keyboard 310 displayed in touch display 201. In response to a user entering a string comprising one or more characters with the software keyboard, the messaging application may display the string in the messaging application's user interface. The messaging application may also determine and display an auto-suggestion for the string. The auto-suggestion may be an auto-correction for the string. For example, the user may enter a string "questoin" in the user interface. The messaging application may display an auto-correction "question" for the string in the user interface. The auto-suggestion may be an auto-completion for the string. For example, the user may enter a string "Disney" in the user interface with the software keyboard, as illustrated in FIG. 3A. The messaging application may display an auto-completion for the string "Disneyland" (301) as illustrated in FIG. 3A. The user may accept the auto-completion "Disneyland" 301 by tapping on the space bar of the software keyboard. The messaging application may detect a single-tap touch event within the region of touch display 201 corresponding to the space bar, and complete the word "Disney" with "Disneyland" in the user interface, while terminating the display of the auto-suggestion "Disneyland" 301 from the user interface.

Ordinarily, the messaging application may display a selectable icon 302 (as illustrated in FIG. 3A) for the user to reject the auto-suggestion "Disneyland" 301. For example, the user may use his finger to tap on selectable icon 302. The messaging application may detect a single-tap touch event within a region of touch display 201 corresponding to selectable icon 302, and remove (terminate displaying) the auto-suggestion "Disneyland" 301 from the user interface. However, due to the limited area of a mobile device's touch display, a selectable icon (for rejecting an auto-suggestion) can be small in size that is difficult for a user to understand, or is difficult for the user to accurately interact with it. Particular embodiments provide intuitive ways for interacting with an auto-suggestion displayed in a user interface. In particular embodiments, a user may reject an auto-suggestion displayed in a user interface by swiping off the auto-suggestion from the user interface.

Figure 4:
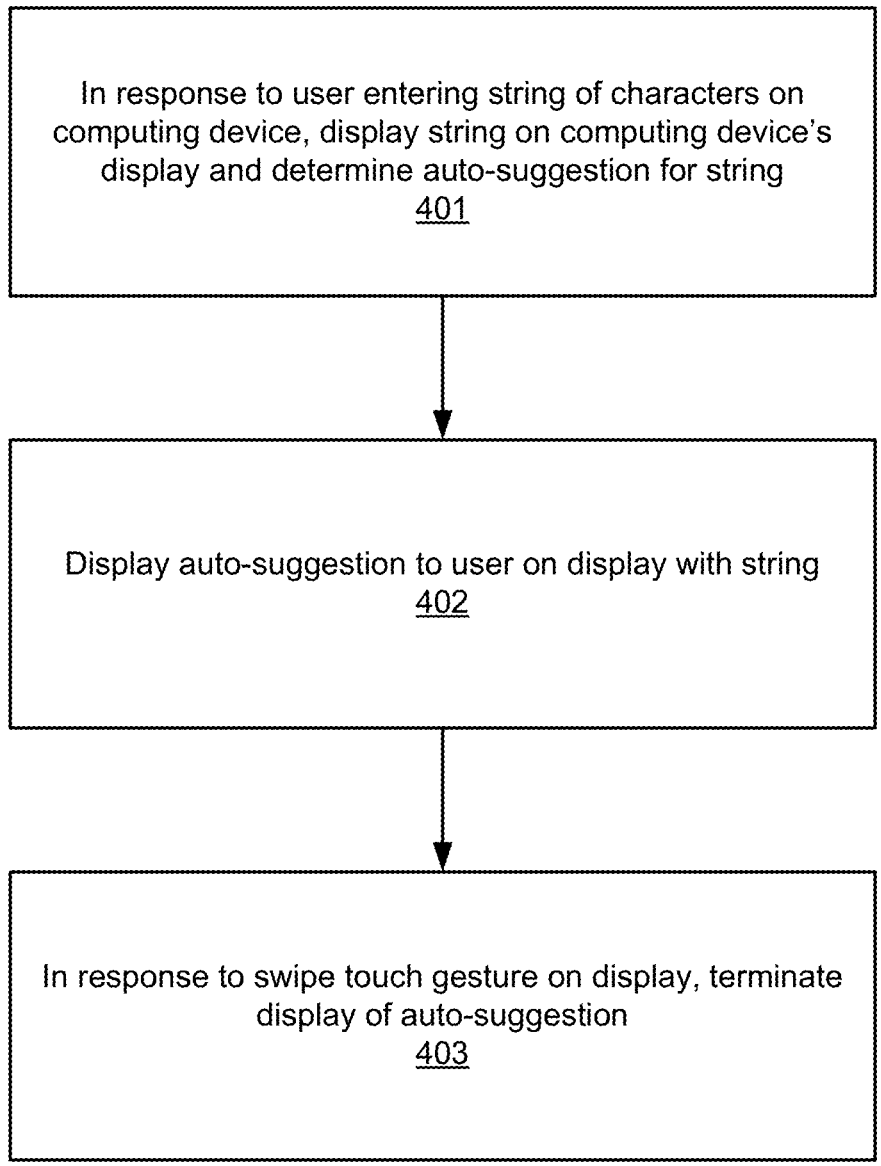
FIG. 4 illustrates an example method for rejecting an auto-suggestion by using a swipe touch gesture.

FIG. 4 illustrates an example method for rejecting an auto-suggestion by using a swipe touch gesture. The example method of FIG. 4 can be implemented by an application (or a process of an application) hosted by one or more processors of a computing device. In particular embodiments, a computing device may be a client device with one or more touch input devices. For example, a computing device may be a laptop computer, tablet computer, mobile phone, or any suitable computing device with one or more touch input devices. For example, a computing device may be mobile device 200 with touch display 201 as illustrated in FIG. 2. In particular embodiments, an application hosted by one or more processors of the computing device may accept a user's touch input on the computing device's touch input devices. For example, an application may be the messaging application of mobile device 200 as illustrated in FIG. 3A. In particular embodiments, in response to a user entering a string of one or more characters on the computing device, the application may display the string to the user on the computing device's display and determine an auto-suggestion for the string (STEP 401). The application may access a dictionary (or other relevant information, such as an address book or contact list) stored in the computing device (or at a remote server) and determine an auto-suggestion for the string. The auto-suggestion may be an auto-correction for the string (e.g., "question" for "questoin"). The auto-suggestion may be an auto-completion for the string (e.g., "Disneyland" for "Disney", "Bill Clinton" for "bill cli"). Additionally, this disclosure contemplates any suitable characters for any suitable languages.

Figure 3B:
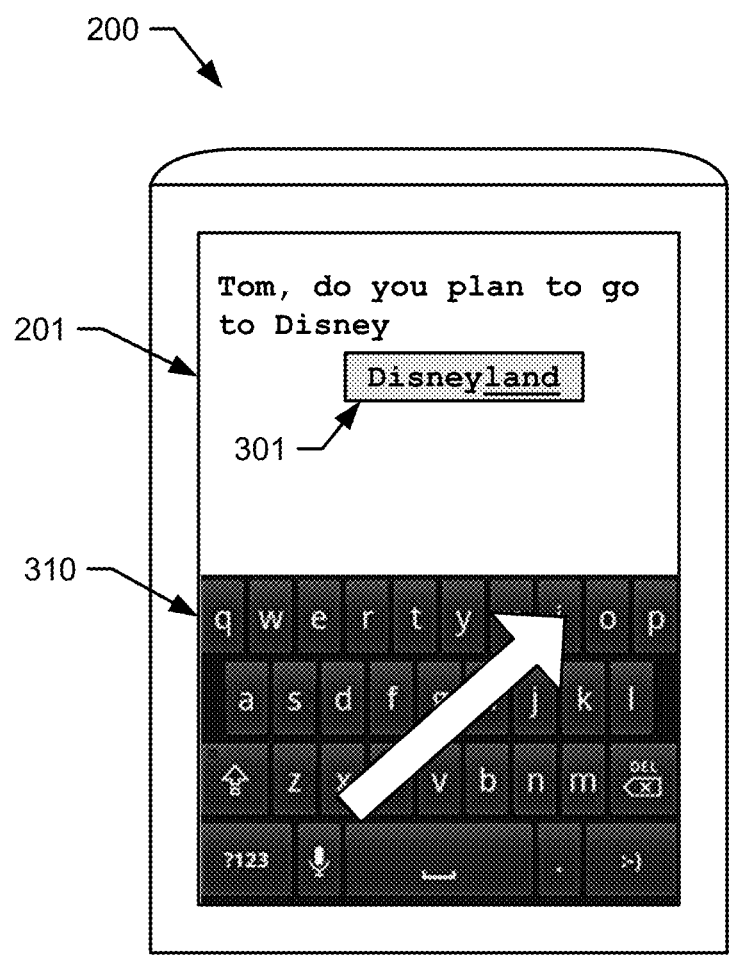

In particular embodiments, the application may display all or a portion of the auto-suggestion to the user on the display with the string (STEP 402). For example, the messaging application may display the auto suggestion "Disneyland" (301) next to the string "Disney" in touch display 201 as illustrated in FIG. 3B. For another example, the messaging application may display the auto suggestion above the software keyboard 310 illustrated in FIG. 3B. Particular embodiments contemplate any suitable placement of the auto-suggestion in the computing device's display.

Figure 3C:
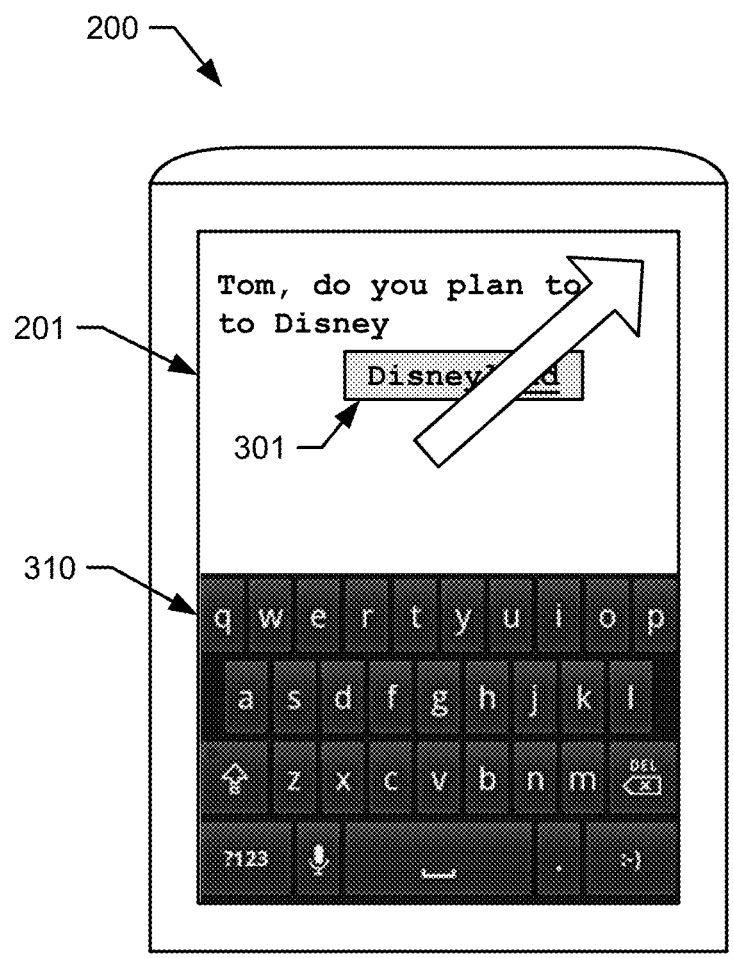
Figure 3D:
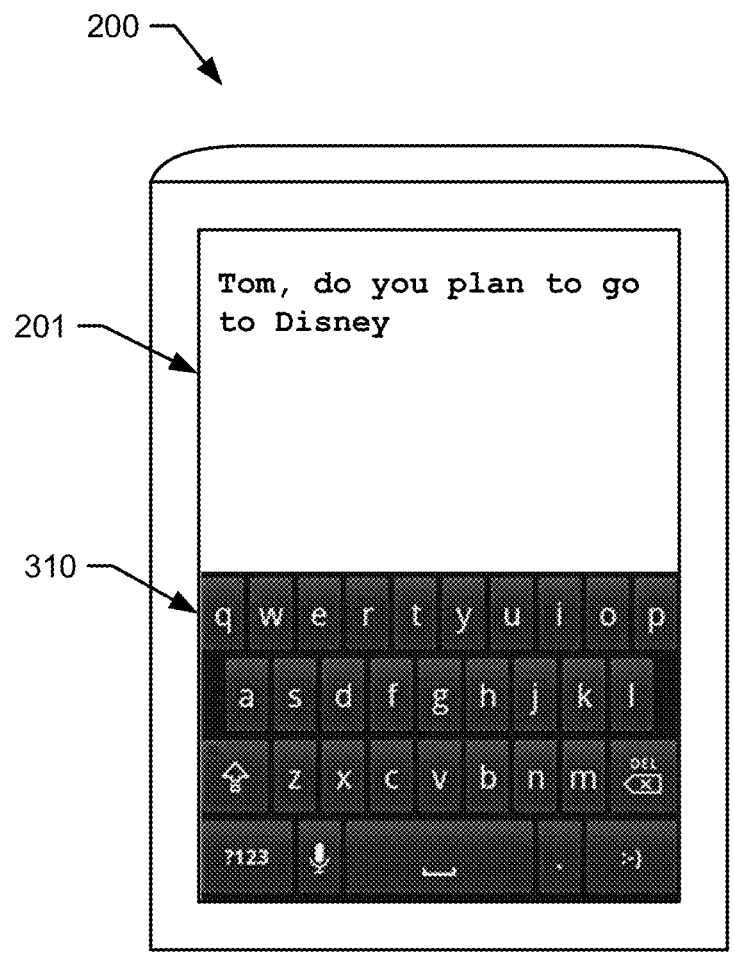

In particular embodiments, in response to a swipe touch gesture on the display, the application may terminate the display of the auto-suggestion (STEP 403). For example, the user may perform a swipe gesture over the software keyboard 310 as illustrated by the arrow in FIG. 3B. For example, the user may perform a swipe gesture over the auto-suggestion 301 as illustrated by the arrow in FIG. 3C. This disclosure contemplates any suitable region of the display for the swipe touch gesture. This disclosure contemplates any suitable direction or path for the swipe touch gesture (e.g., upward, downward, leftward, rightward, diagonal, X-shape, V-shape, and so on). For example, the messaging application may detect the swipe touch gesture, and terminate the display of auto-suggestion 301 in touch display 201, as illustrated in FIG. 3D.

Figure 3E:
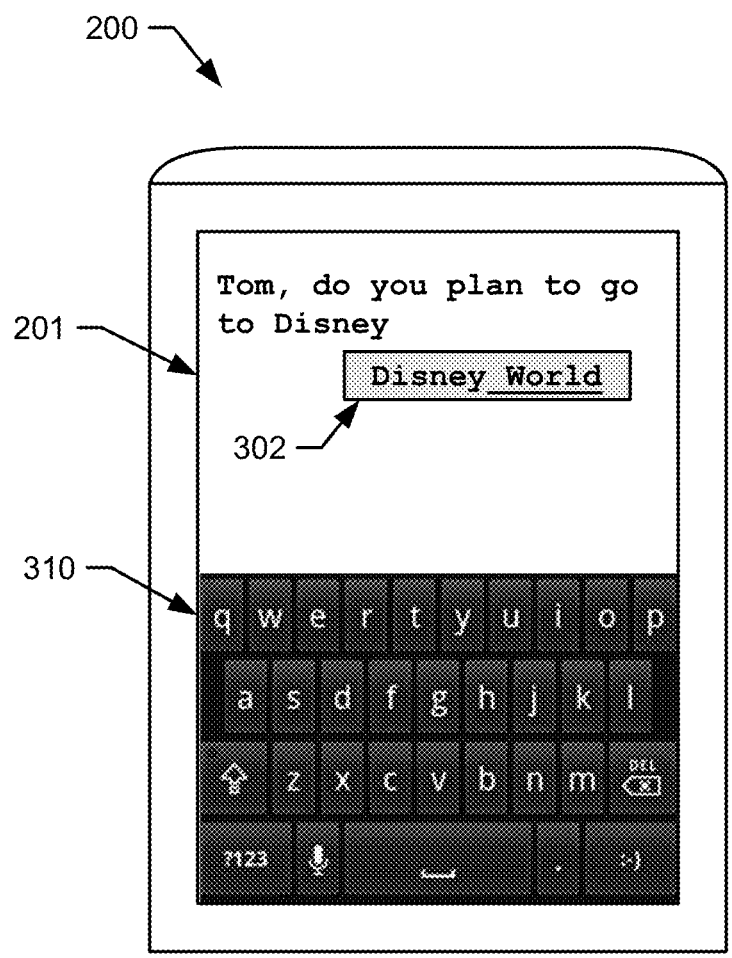
Figure 3F:
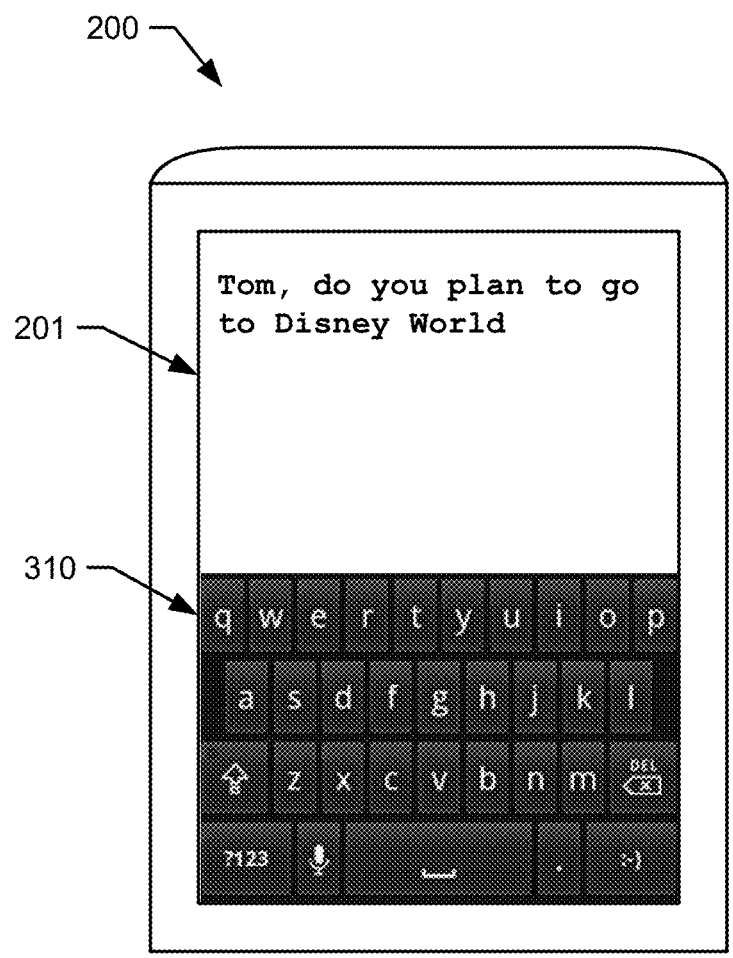

In some embodiments, in response to the swipe touch gesture, the application may determine another auto-suggestion for the string (e.g., by accessing a dictionary stored in the computing device or at a remote server). The application may display all or a portion of the other auto-suggestion to the user on the computing device's display with the string. For example, the messaging application may detect the swipe touch gesture, and display another auto-suggestion ("Disney World" 302) on touch display 201, as illustrated in FIG. 3E. The user may reject the other auto-suggestion by performing a swipe gesture on touch display 201 as described earlier. The user may accept the other auto-suggestion by tapping on the space bar of the software keyboard 310. The messaging application may detect a tap gesture within a region of touch display 201 corresponding to the space par, and implement the other auto-suggestion for the string (while terminating the display of the other auto-suggestion), as illustrated in FIG. 3F. This disclosure contemplates any suitable touch gestures on touch display 201 for rejecting or accepting an auto-suggestion, or receiving another auto-suggestion. For example, the user may reject an auto-suggestion by using a rightward swipe gesture over the auto-suggestion on touch display 201. The user may accept the auto-suggestion by using a single-tap gesture over the auto-suggestion on touch display 201. The user may reject the auto-suggestion and receive another auto-suggestion by using a double-tap gesture over the auto-suggestion on touch display 201. For example, the user may reject an auto-suggestion by using a X-shape swipe gesture over the auto-suggestion on touch display 201. The user may accept the auto-suggestion by using a V-shape swipe gesture over the auto-suggestion on touch display 201. The user may reject the auto-suggestion and receive another auto-suggestion by using a downward swipe gesture in any suitable location on touch display 201.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
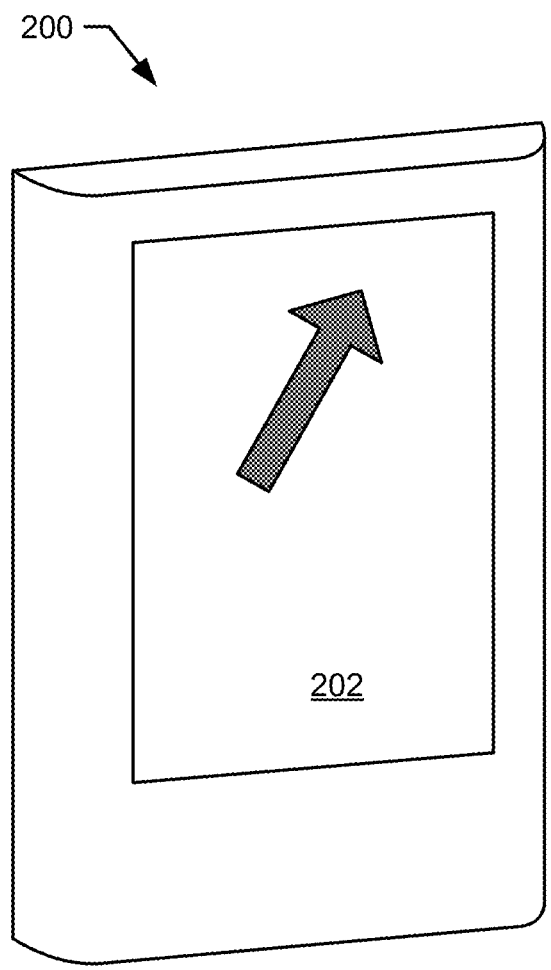
FIG. 5 illustrates a back-side touch input device of the example mobile device illustrated in FIG. 2.

FIG. 5 illustrates a back-side touch input device of the example mobile device illustrated in FIG. 2. In the example of FIG. 5, mobile device 200 may comprise touch-display 201 disposed on the front side of the device's housing (as illustrated earlier in FIG. 2) and a second touch surface 202 disposed on a back side of the device's housing. This disclosure contemplates any suitable placement of a second touch input device of a computing device. Touch surface 202 may be a single-touch, dual-touch, or multi-touch device. In some embodiments, touch surface 202 may be a touch display. One or more applications hosted by mobile device 200 may be configured to detect and respond to one or more touch events or gestures performed on touch surface 202, by subscribing as listeners to touch event module in the device's touch gesture library.

The example method of FIG. 4 may be implemented with a second touch input device of a computing device, such as with touch surface 202 of mobile device 200 illustrated in FIG. 5. For example, the messaging application described earlier may, in response to a user entering a string of one or more characters, display the string in touch display 201 and determine an auto-suggestion for the string (STEP 401). The messaging application may display the auto-suggestion on touch display 201 with the string (e.g., as illustrated in FIG. 3B) (STEP 402). The user may reject the auto-suggestion by performing a swipe touch gesture on back-side touch surface 202, as illustrated by the arrow in FIG. 5. In response to the swipe touch gesture, the messaging application may terminate the display of the auto-suggestion in touch display 201 (STEP 403). This disclosure contemplates any suitable touch gestures on the second touch input device for rejecting or accepting the auto-suggestion. For example, the user may reject the auto-suggestion by using single-finger single-tap touch gesture on the second touch input device. For example, the user may accept the auto-suggestion by using two-finger single-tap touch gesture on the second touch input device. For example, the user may reject the auto-suggestion and receive another auto-suggestion by using a swipe touch gesture on the second touch input device.

In particular embodiments, the application (or an operating system of the computing device) may store in a local storage of the computing device, a user preference file comprising user-specific data for the feature of rejecting an auto-suggestion by touch gestures as illustrated by the example method of FIG. 4. For example, a user of the computing device may turn on or off the feature of rejecting an auto-suggestion by touch gestures for the application, causing the application to store the user's preference (e.g., the feature is turned off) in the user preference file. For another example, the application may use a machine learning algorithm to dynamically improve the accuracy of recognition of a user's touch gestures for rejection an auto-suggestion, while storing in the user preference file training data for the machine learning algorithm. In particular embodiments, the application may transmit and store the user preference file in a remote server over the Internet (i.e., the user preference file is hosted in the "cloud"). In particular embodiments, the user may access the user preference file (stored in the remote server over the Internet) from another computing device of the user. That is, the user preference file may be synchronized among some or all of the user's computing devices. For example, the user may turn off (from being turned on) the feature of rejecting an auto-suggestion by touch gestures for the application on the user's mobile phone, causing the application to store the change in the local and remote copies of the user preference file. As the user accesses the user's tablet computer, an application (or an operating system) running on the tablet computer may access the user preference file stored in the remote server and turn off the feature of rejecting an auto-suggestion by touch gestures accordingly. Although this disclosure describes or illustrates particular features being synchronized among multiple computing devices of a user, this disclosure contemplates synchronizing any suitable number of any suitable features among any suitable computing devices of the user (e.g. by using user preference files as described above). For another example, the user may acquire a new mobile phone. An application or operating system running on the new mobile phone may access the user preference file stored in the remote server for the training data from the user's existing (or previously owned) mobile phone (or another computing device). Based on the training data, the application on the new mobile phone may accurately recognize the user's touch gesture for rejecting an auto-suggestion, without further utilizing the machine learning algorithm.

In some embodiments, the feature of rejecting an auto-suggestion by touch gestures (as illustrated by the example method of FIG. 4) may be turned on or off on the user's computing device based on activities of the user's social contacts in a social-networking system. For example, the feature of rejecting an auto-suggestion by touch gestures on a user's computing device may be turned on if a number of the user's social contacts within a specified social distance (e.g., two degrees or separation) exceeds a specified threshold (e.g., 10). For example, a user preference file (for the feature of rejecting an auto-suggestion by touch gestures) described above may be stored with a corresponding user node in the social graph of the social-networking system. An application on a particular user's computing device may access the social graph, determine that more than 10 of the particular user's first- and second-degree friends have the feature activated (turned on) on their respective computing devices, and turn on the feature on the particular user's computing device accordingly. The application may make a suggestion (within its user interface) to the particular user about the feature, and turn on the feature based on the user's confirmation. That is, the particular user may "discover" the feature of rejecting an auto-suggestion based on touch gestures, if more than 10 of his first- and second-degree friends having the feature activated on their respective computing devices. Moreover, this disclosure contemplates any suitable feature that may be turned on or off on a user's computing device based on activities of the user's social contacts in the social-networking system (e.g., by using user preference files stored in the social graph as described above). The social-networking system and social graph are described later.

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g. a social graph), as well as provide social-networking services (e.g. wall-posts, photo-sharing, or instant-messaging) to facilitate social interaction between or among users in the social-networking system.

A social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system. For example, the user may provide his name, profile picture, city of residence, contact information e.g., a phone number, an email address), birth date, gender, marital status, family status, employment, education background, preferences, interests, and other demographical information to be included in the user node. Each user node of the social graph may correspond to a web page (typically known as a profile page). For example, in response to a request including a user name, the social-networking system can access a user node corresponding to the user name, and construct a profile page including the name, a profile picture, and other information associated with the user. A concept node may correspond to a concept of the social-networking system. For example, a concept can represent a real-world entity, such as a movie, a song, a sports team, a celebrity, a restaurant, or a place or a location. An administrative user of a concept node corresponding to a concept may create the concept node by providing information of the concept (e.g., by filling out an online form), causing the social-networking system to create a concept node comprising information associated with the concept. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept. An edge between a pair of nodes may represent a relationship between the pair of nodes. For example, an edge between two user nodes can represent a friendship between two users. For example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user likes a celebrity), In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

A social-networking system may support a variety of applications, such as photo sharing, on-line calendars and events, instant messaging, and advertising. For example, the social-networking system may also include media sharing capabilities. For example, the social-networking system may allow users to post photographs and other multimedia files to a user's profile page (typically known as wall posts) or in a photo album, both of which may be accessible to other users of the social-networking system. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 6:
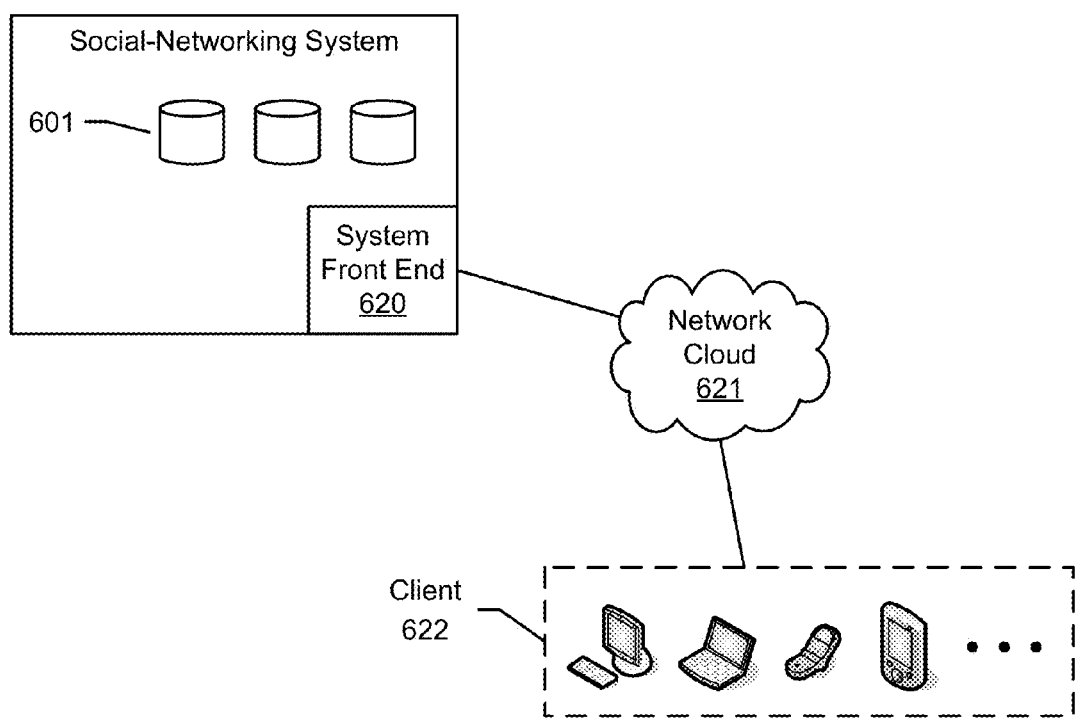
FIG. 6 illustrates an example network environment of a social-networking system.

FIG. 6 illustrates an example network environment of a social-networking system. In particular embodiments, a social-networking system may comprise one or more data stores 601. For example, each data store 601 may comprise one or more storage devices. In particular embodiments, the social-networking system may store in data stores 601 a social graph comprising user nodes, concept nodes, and edges between nodes as described earlier. Each user node may comprise one or more data objects corresponding to information associated with a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system may comprise one or more computing devices (e.g., servers) hosting functionality directed to operation of the social-networking system. In particular embodiments, one or more of data stores 601 may be operably connected to the social-networking system's front end 620. A user of the social-networking system may access the social-networking system using a client device such as client device 622. In particular embodiments, front end 620 may interact with client device 622 through network cloud 621. For example, front end 620 may be implemented in software programs hosted by one or more computing devices of the social-networking system. Front end 620 may include web or HTTP server functionality, as well as other functionality, to allow users to access the social-networking system.

Client device 622 may be a desktop computer, laptop computer, tablet computer, personal digital assistant (PDA), in- or out-of-car navigation system, smart phone or other cellular or mobile phone, or mobile gaming device, among other suitable computing devices. Client device 622 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network.

Network cloud 621 may represent a network or collection of networks (such as the Internet, a corporate intranet, a virtual private network, a local area network, a wireless local area network, a cellular network, a wide area network, a metropolitan area network, or a combination of two or more such networks) over which client devices 622 may access the social network system.

In particular embodiments, the social-networking system may store in data stores 601 data associated with applications and services provided by the social-networking system. In particular embodiments, the social-networking system may store user event data in data stores 601. For example, a user may register a new event by accessing a client application to define an event name, a time and a location, and cause the newly created event to be stored (e.g., as a concept node) in data stores 601. For example, a user may register with an existing event by accessing a client application to confirming attending the event, and cause the confirmation to be stored in data stores 601. For example, the social-networking system may store the confirmation by creating an edge in a social graph between a user node corresponding to the user and a concept node corresponding to the event, and store the edge in data stores 601.

Figure 7:
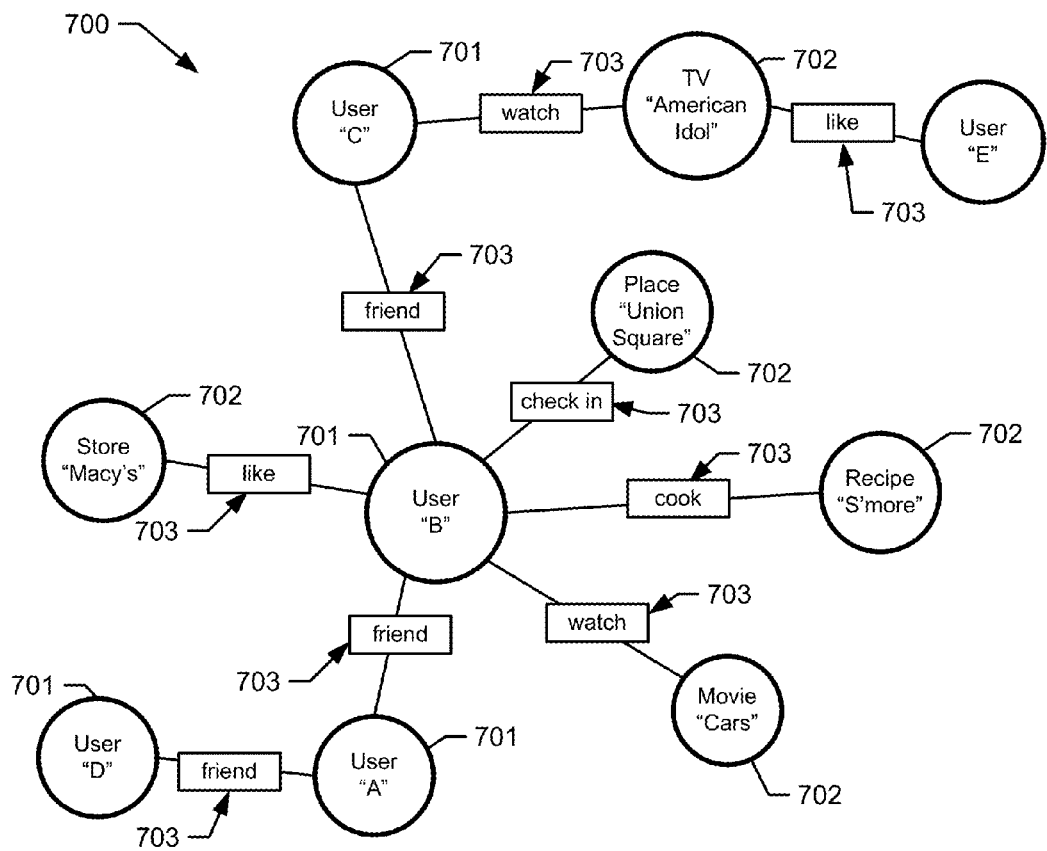
FIG. 7 illustrates an example social graph.

FIG. 7 illustrates an example social graph 700. In the example of FIG. 7, social graph 700 may include user nodes 701, concept nodes 702, and edges 703 between nodes. An edge 703 between a pair of nodes may represent a relationship (or an action) between the pair of nodes. For example, user "B" is a friend of user "A" and user "C", respectively, as illustrated by the edges between users nodes "B" and "A", and between users nodes "B" and "C." For example, users "C" watches TV show "American Idol", as illustrated by the edges between the "American Idol" concept node and user nodes "C." Similarly, the edge between the user node "B" and the concept node "Macy's" may indicate that user "B" likes "Macy's." The edge between user node "B" and the "Cars" concept node indicates that user "B" watches the movie "Cars." The edge between user node "B" and the "S'more" concept node indicates that user "B" cooks the recipe "S'more." The edge between user node "B" and the "Union Square" concept nodes indicates that user "B" checks in to "Union Square." The edge between user node "E" and the "American Idol" concept node indicates that user "E" likes TV show "American Idol." Note that a social graph can be much larger than social graph 700 illustrated in FIG. 7. For example, a social graph used by Facebook of Menlo Park, Calif. can have a number of nodes in the order of $10^8$, and a number of edges in the order of $10^{10}$.

As described earlier, an edge between a pair of nodes may indicate a direct relationship between the pair of nodes. It is also desirable to determine likelihood of a relationship or an interest between a pair of nodes that are two or more hops away. For example, the social-working system may provide (e.g., via an email or a wall-post) a recommendation (e.g., an advertisement) for "Macy's" to user "B", given the direct relationship represented by the edge between the user node "B" and the concept node "Macy's" as illustrated in FIG. 7. The social-networking system may also provide a recommendation for "Macy's" to first-degree friends of user "B" (e.g., users "C" and "A") as first-degree friends often share comment interests.

Figure 8:
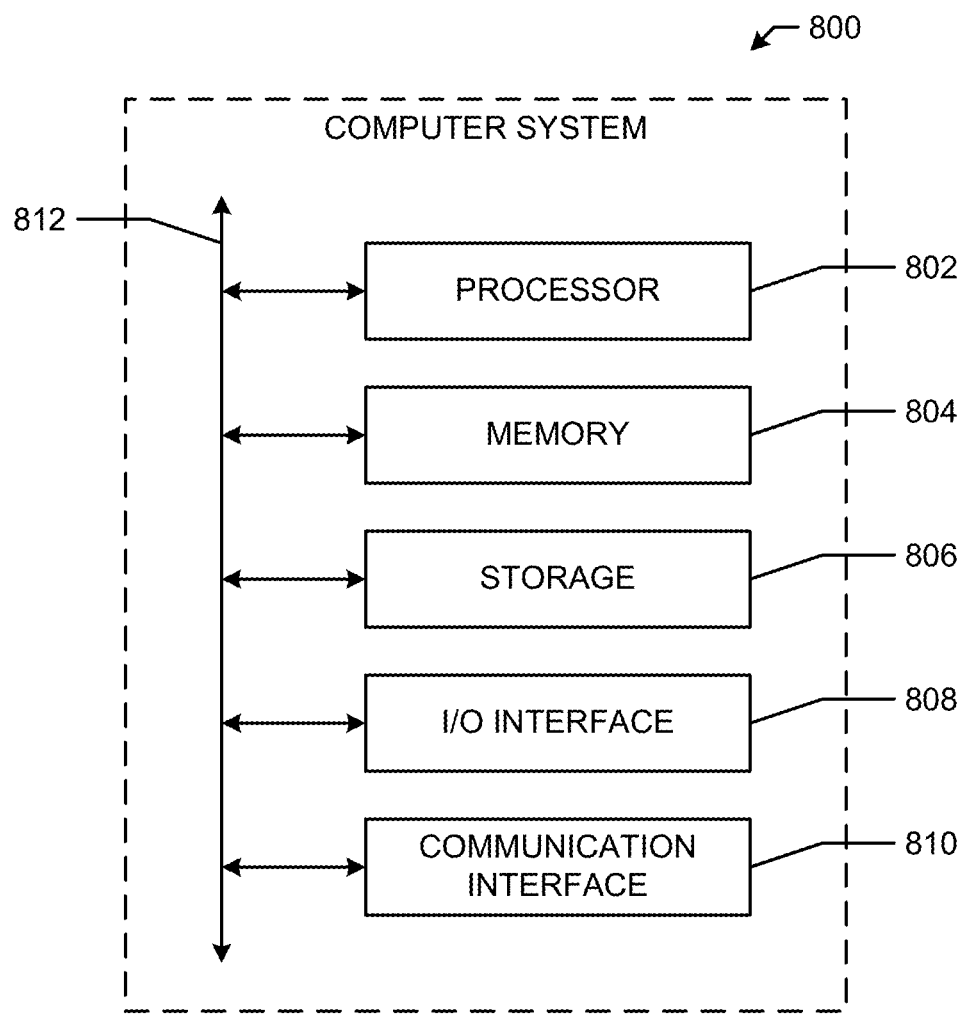
FIG. 8 illustrates an example computer system.

FIG. 8 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network,), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANS-PORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    in response to a user entering a string of one or more characters on a computing device, displaying the string on a display of the computing device and determining a plurality of auto-suggestion for the string;
    displaying all or a portion of exactly one of the auto-suggestion on the display with the string, wherein the displayed auto-suggestion is located substantially adjacent to the string and wherein no other auto-suggestion of the plurality of auto-suggestions is displayed simultaneously;
    in response to a swipe touch gesture on the display detected over a region defined by the displayed auto-suggestion, causing the displayed auto-suggestion to disappear;
    determining a second one of the auto-suggestions for the string; and
    displaying all or a portion of the second auto-suggestion on the display with the string.

2. The method of claim 1, wherein the displayed auto-suggestion is an auto-correction or an auto-completion of the string.

3. The method of claim 1, further comprising, in response to the user making a particular touch gesture on the display, implementing the second auto-suggestion for the sting.

4. The method of claim 1, wherein the swipe touch gesture occurred substantially at the location adjacent to the string.

5. The method of claim 1, wherein the swipe touch gesture occurred within an area of a touch-screen keyboard of the computing device.

6. One or more computer-readable non-transitory storage media embodying software that is operable when executed to:
    in response to a user entering a string of one or more characters on a computing device, display the string on a display of the computing device and determine an a plurality of auto-suggestion for the string;
    display all or a portion of exactly one of the auto-suggestion on the display with the string, wherein the displayed auto-suggestion is located substantially adjacent to the string and wherein no other auto-suggestion of the plurality of auto-suggestions is displayed simultaneously;
    in response to a swipe touch gesture on the display detected over a region defined by the displayed auto-suggestion, cause the displayed auto-suggestion to disappear;
    determining a second one of the auto-suggestions for the string; and
    displaying all or a portion of the second auto-suggestion on the display with the string.

7. The media of claim 6, wherein the displayed auto-suggestion is an auto-correction or an auto-completion of the string.

8. The media of claim 6, wherein the software is further operable to, in response to the user making a particular touch gesture on the display, implement the second auto-suggestion for the sting.

9. The media of claim 6, wherein the swipe touch gesture occurred substantially at the location adjacent to the string.

10. The media of claim 6, wherein the swipe touch gesture occurred within an area of a touch-screen keyboard of the computing device.

11. A device comprising:
    one or more processors; and
    one or more computer-readable non-transitory storage media coupled to the processors and embodying software that is operable when executed by the processors to:
        in response to a user entering a string of one or more characters on the device, display the string on a display of the device and determine an a plurality of auto-suggestions for the string;
        display all or a portion of exactly one of the auto-suggestion on the display with the string, wherein the displayed auto-suggestion is located substantially adjacent to the string and wherein no other auto-suggestion of the plurality of auto-suggestions is displayed simultaneously;

in response to a swipe touch gesture on the display detected over a region defined by the displayed auto-suggestion, cause the displayed auto-suggestion to disappear;

determining a second one of the auto-suggestions for the string; and displaying all or a portion of the second auto-suggestion on the display with the string.

12. The device of claim 11, wherein the displayed auto-suggestion is an auto-correction or an auto-completion of the string.

13. The device of claim 11, wherein the software is further operable when executed by the processors to, in response to the user making a particular touch gesture on a the display, implement the other auto-suggestion for the sting.

14. The device of claim 11, wherein the swipe touch gesture occurred substantially at the location adjacent to the string.

15. The device of claim 11, wherein the swipe touch gesture occurred within an area of a touch-screen keyboard of the device.

* * * * *